United States Patent
Mentessi

[11] 3,863,986
[45] Feb. 4, 1975

[54] OPERATING LINKAGE FOR BOTTOM DUMP DOORS

[75] Inventor: Roland A. Mentessi, Parma, Ohio

[73] Assignee: General Motors Corporation, Detroit, Mich.

[22] Filed: Sept. 4, 1973

[21] Appl. No.: 394,139

[52] U.S. Cl. .............................. 298/35 M, 298/36
[51] Int. Cl. ............................................ B60p 1/56
[58] Field of Search ........................... 298/35 M, 36

[56] References Cited
UNITED STATES PATENTS

| | | | |
|---|---|---|---|
| 2,494,472 | 1/1950 | De Saussure | 298/35 M X |
| 2,723,878 | 11/1955 | Rockwell | 298/35 M X |
| 3,427,075 | 2/1969 | Kress et al | 298/35 M |

Primary Examiner—Trygve M. Blix
Assistant Examiner—Barry L. Kelmachter
Attorney, Agent, or Firm—Edward J. Biskup

[57] ABSTRACT

A bottom dump vehicle including a tractor and trailing hopper provided with an elongated opening adapted to be opened and closed by a pair of longitudinally extending doors. Each door is supported by a linkage which has a power operated actuator that causes the doors to move between a first position wherein the doors are horizontally aligned for closing the opening and a second position wherein the doors are shifted laterally outwardly to expose the opening.

2 Claims, 4 Drawing Figures

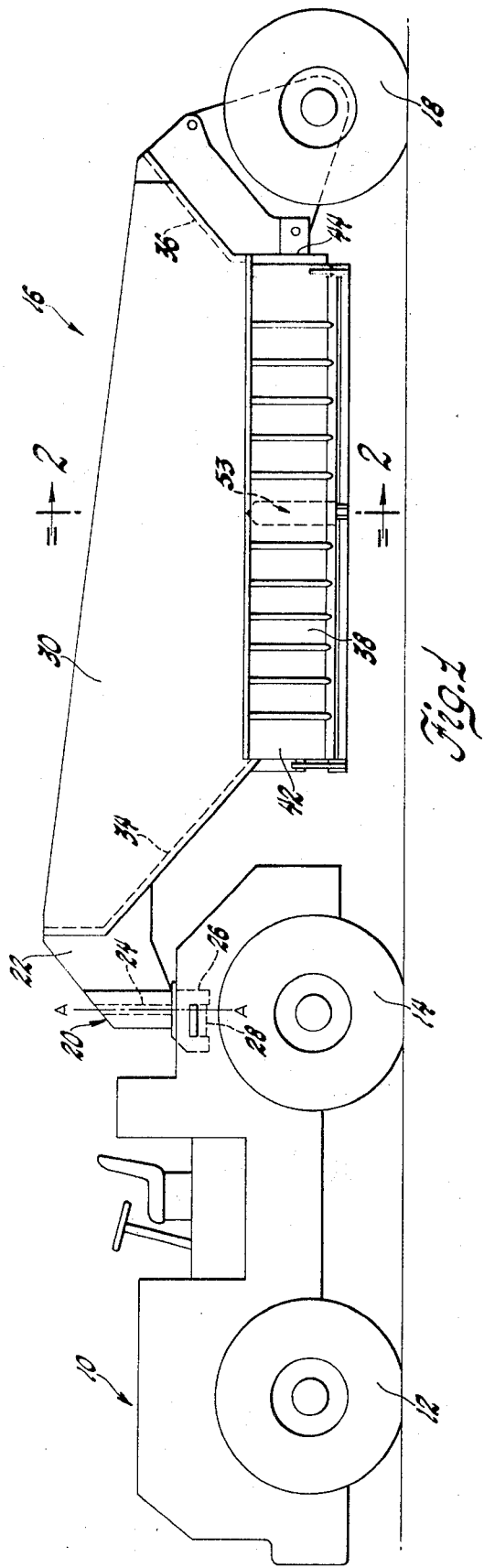

ОPERATING LINKAGE FOR BOTTOM DUMP DOORS

This invention concerns earthmoving vehicles and more particularly a bottom dump vehicle that includes a hopper supported on rubber tires and adapted to be drawn by a tractor. The hopper is designed to drop its load by opening a pair of doors which run the full length of the bottom of the hopper and are hingedly connected thereto.

The objects of the present invention are to provide a bottom dump vehicle having an improved operating mechanism for the doors of the hopper and that includes a fluid operated actuator for opening and closing the doors; to provide a linkage for supporting the discharge doors of a hopper that includes double-acting power cylinder means for positively opening and closing the doors with the cylinder means being located within an enclosure formed in the material retaining portion of the hopper; to provide a pair of distorted parallelogram linkages for supporting the doors of an earth moving bottom dump hopper that includes a pair of vertically orientated double-acting hydraulic cylinders that are located within the hopper in side-by-side relationship and act together to open and close the doors; and to provide a pair of laterally spaced linkages for supporting the doors of a tractor drawn wheeled hopper with each linkage including J-shaped link members which through power-operated cylinders allow the doors to move between a horizontally aligned position for closing the discharge chute and to a generally upright position for opening the chute.

The above objects and others are realized in accordance with the invention by a bottom dump vehicle having a trailing hopper provided with side walls and end walls which define an elongated opening which is adapted to be opened and closed by a pair of longitudinally extending doors. An operating linkage is proivded for controlling movement of the doors between a first position wherein the doors are horizontally aligned to close the opening and a second position wherein the doors are shifted laterally outwardly to expose the opening. Each of the doors has an inner edge and an outer edge which are parallel to each other and the linkage for each of the doors includes a first link member and a second link member. The first link member is supported on the door adjacent the inner edge by a first pivotal connection while the second link member has one end thereof supported on the door by a second pivotal connection located at the outer edge of the door. The other ends of the first and second link members are respectively connected by horizontally spaced third and fourth pivotal connections to the hopper. A fluid operated actuator is provided for moving the door between the aforementioned positions and the actuator has one end thereof pivotally connected to the first link member. The opposite end of the actuator is pivotally connected to the hopper and the arrangement is such that when the door is in the closed position, a straight line passing through the centers of the pivotal connections of the actuator extend between the centers of the first and third pivotal connections of the first link member.

Other objects and advantages of the present invention will be apparent from the following detailed description when taken with the drawings in which:

FIG. 1 is a side elevational view of a bottom dump vehicle incorporating a door operating linkage made according to this invention;

FIG. 2 is an enlarged sectional view taken on line 2—2 of FIG. 1 and shows the operating linkage made according to the invention for opening the doors of the hopper;

FIG. 3 is a view taken along line 3—3 of FIG. 2; and

Figure 4:
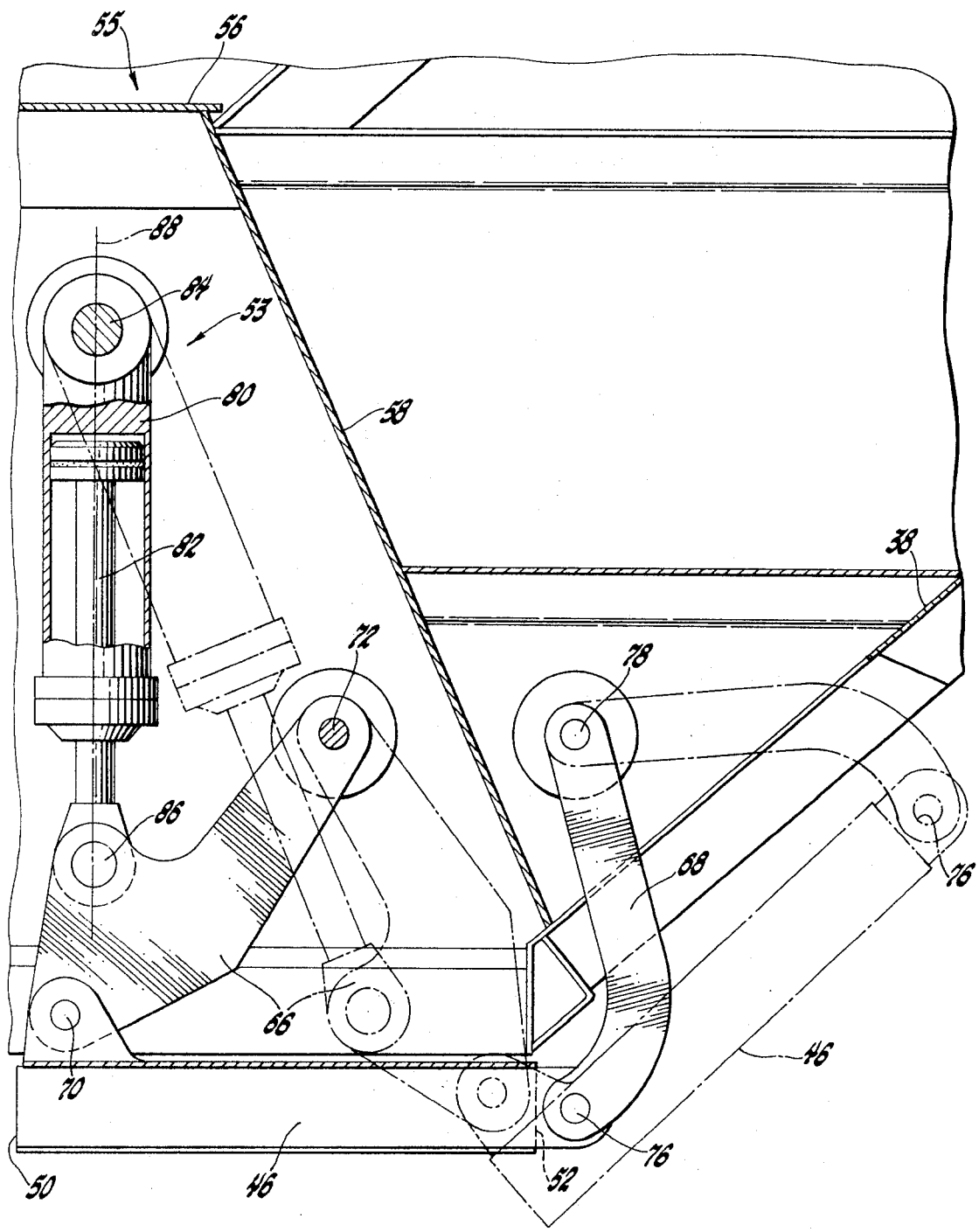
FIG. 4 is an enlarged view of a portion of the operating linkage shown in FIG. 3 and illustrates the position of the link members and the door when the latter is in the opened position and closed position.

Referring to the drawings and more particularly FIG. 1 thereof a bottom dump vehicle is shown comprising a tractor 10 having front dirigible wheels 12 and rear wheels 14. The tractor 10 is connected to a semi-trailer type hopper 16 having wheels 18 and having the front end thereof supported on the tractor by a suitable coupling 20 which permits the tractor 10 and hopper 16 to be movable relative to each other about a vertical steer axis A—A and a horizontal oscillation axis. Thus, the front end of the hopper 16 is rigidly formed with a draw bar 22 that is mounted on a vertically extending king pin 24 which in turn is rigid with a pivot casting 26. The king pin 24 provides the vertical steer axis A—A about which the tractor 10 and the hopper 16 are articulated relative to each other while the pivot casting 26 is connected by a horizontal pin 28 to the tractor 10 and allows relative movement between the tractor and the hopper about a longitudinally extending horizontal axis so that the vehicle can traverse irregular ground.

As seen in FIGS. 1 and 2, the hopper 16 includes a body portion which comprises a pair of laterally spaced vertical side panels 30 and 32 which are interconnected by front and rear end panels 34 and 36. The lower ends of the side panels 30 and 32 are rigidly connected with side walls 38 and 40 respectively which slope inwardly and downwardly and together with end walls 42 and 44 define an elongated longitudinally extending opening which is rectangular in shape and can be closed and opened by a pair of elongated and longitudinally extending doors 46 and 48. As should be apparent, the side walls 38 and 40 are inclined as shown in FIG. 2 so as to allow the material within the hopper 16 to be readily discharged by gravity whenever the doors 46 and 48 are opened. In addition, it will be noted that each of the doors 46 and 48 is rectangular in shape and includes an inner straight edge 50 and an outer straight edge 52 that lie in vertical planes which are parallel to each other. Thus, when the doors 46 and 48 are in the closed position the inner edge 50 of each door is located adjacent to each other while the outer edge 52 of each door is located adjacent to the bottom end of the associated side wall.

An operating mechanism, composed of a pair of linkages 53 and 54, is located midway between the end walls 42 and 44 within an enclosure 55 that extends into the material retaining portion of the hopper 16. As seen in FIGS. 2 and 3, the enclosure 55 is defined by a top wall 56 and 57, a pair of side walls 58 and 60 and end walls 62 and 64, and the linkages for the doors 46 and 48 are identical in construction and the mirror image of each other. Thus, each linkage comprises a pair of J-shaped link members which are respectively identified by the reference numerals 66 and 68. The link member 66 has the lower end thereof supported by a pivotal connection 70 located on the associated door adjacent the inner edge 50 thereof. The upper end of the link member 66 is supported by a pivotal connection 72 which includes a pin fixed between the end walls 62 and 64 of the enclosure 55. The lower end of the link member 68 is joined by a pivotal connection 76 to the outer edge 52 of the associated door while the upper end of the link member 68 is supported by a pivotal connection 78. It will be noted that the pivotal connections 72 and 78 joining the upper ends of the link members 66 and 68 are laterally spaced from each other and located along a horizontal axis while the pivotal connections 70 and 76 joining the link members 66 and 68 to the door are also laterally spaced from each other but are located at different elevations.

In order to move the doors 46 and 48 between open and closed positions as seen in FIG. 4, each operating linkage 53 and 54 is provided with a double-acting hydraulic cylinder which includes relative movable cylinder and piston members 80 and 82. The cylinder member 80 of each hydraulic cylinder is connected by a pivotal connection 84 to the end walls 62 and 64 of the enclosure 55. The piston member 82 of each hydraulic cylinder is joined by a pivotal connection 86 to the link member 66 at a point located above the pivotal connection 70. The arrangement is such that when the doors are in a closed position shown in full-lines in FIG. 4, a center line 88 passing through the centers of the pivotal connections 84 and 86 joining the hydraulic cylinder to the hopper 16 and the link member 66, is located in a longitudinally extending vertical plane which is to the right of the pivotal connection 70. Accordingly, by directing pressurized fluid to the head end of the hydraulic cylinder seen in FIG. 4, the latter expands and causes the door 46 to be swung laterally outwardly under the control of the link members 66 and 68 to the phantom-line position. As aforementioned when the doors 66 and 68 are in the open position the load within the hopper 16 is dropped by gravity through the lower opening thereof. After the load is dropped from the hopper 16, pressurized fluid can be directed to the piston end of each hydraulic cylinder causing the latter to contract and return the doors to the full line position and thereby close the opening.

It will be understood that the hydraulic cylinders of each operating linkage 53 and 54 work together so that concurrent operation of the doors 46 and 48 is realized during the opening and closing movement thereof. In addition, it will be noted that the front and rear end of each door adjacent the end walls 42 and 44 is hingedly supported by link members which are similarly shaped and arranged as the link members 66 and 68.

Various changes and modifications can be made in this construction without departing from the spirit of the invention. Such changes and modifications are contemplated by the inventor and he does not wish to be limited except by the scope of the appended claims.

The embodiments of the invention in which an exclusive property or priviledge is claimed are defined as follows:

1. In a bottom dump vehicle having a trailing hopper provided with an elongated opening adapted to be opened and closed by a pair of longitudinal doors, a linkage for controlling movement of said doors between a first position wherein said doors are horizontally aligned to close said opening and a second position wherein said doors are shifted laterally outwardly to expose the opening and permit the contents within the hopper to be dropped by gravity, said linkage including a pair of hydraulic cylinders, each of said doors having an inner edge and an outer edge, said linkage for each of said doors comprising a first link member and a second link member, a first pivotal connection supporting one end of the first link member on said each of said doors at said inner edge, a second pivotal connection supporting one end of the second link member on said each of said doors at the outer edge thereof, the other ends of said first and second link members being connected respectively to said hopper by horizontally spaced third and fourth pivotal connections, one of said pair of hydraulic cylinders being connected to said each of said doors for moving said each of said doors between said first and second positions, said one of said pair of hydraulic cylinder having one end thereof connected to said first link member by a fifth pivotal connection and the other end connected to the hopper by a sixth pivotal connection, said pivotal connections being so arranged that when said each of said doors is in the first position a straight line passing through the centers of the fifth and sixth pivotal connections extends between the centers of the first and third pivotal connections of the first link member.

2. In a bottom dump vehicle having a trailing hopper provided with side walls and end walls which define an elongated opening adapted to be opened and closed by a pair of longitudinal doors, an enclosure located between said end walls and extending into said hopper, a linkage within said enclosure for controlling movement of said doors between a first position wherein said doors are horizontally aligned to close said opening and a second position wherein said doors are shifted laterally outwardly to expose the opening and permit the contents within the hopper to be dropped by gravity, said linkage including a pair of hydraulic cylinders, each of said doors having an inner edge and an outer edge, said linkage for each of said doors comprising a first link member and a second link member each of which is J-shaped, a first pivotal connection supporting one end of the first link member on said each of said doors at said inner edge, a second pivotal connection supporting one end of the second link member on said each of said doors at the outer edge thereof, the other ends of said first and second link members being connected respectively by horizontally spaced third and fourth pivotal connections to said hopper, one of said hydraulic cylinders being connected to said each of said doors for moving said each of said doors between said first and second positions, said cylinder having one end thereof connected to said first link member by a fifth pivotal connection and the other end connected to the hopper by a sixth pivotal connection, said pivotal connections being so arranged that when said each of said doors is in the first position the hydraulic cylinder is vertically orientated and a straight line passing through the centers of the fifth and sixth pivotal connections extends between the centers of the first and third pivotal connections of the first link.

\* \* \* \* \*